US007077780B2

(12) United States Patent
Yamamoto (10) Patent No.: US 7,077,780 B2
(45) Date of Patent: Jul. 18, 2006

(54) TOROIDAL TYPE CONTINUOUSLY VARIABLE TRANSMISSION

(75) Inventor: Takeshi Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 542 days.

(21) Appl. No.: 10/623,157

(22) Filed: Jul. 21, 2003

(65) Prior Publication Data

US 2004/0209729 A1    Oct. 21, 2004

(30) Foreign Application Priority Data

Aug. 27, 2002    (JP)    ............................. 2002-246131

(51) Int. Cl.
*F16H 15/38*    (2006.01)
(52) U.S. Cl. ............................ 476/42; 476/40; 476/46; 476/72
(58) Field of Classification Search ................. 476/40, 476/41, 42, 46, 72
See application file for complete search history.

(56) References Cited

U.S. PATENT DOCUMENTS

| 4,909,092 | A | * | 3/1990 | Machida et al. | ............... | 476/46 |
| 5,683,326 | A | * | 11/1997 | Inoue | .......................... | 476/10 |
| 6,176,805 | B1 | * | 1/2001 | Itoh et al. | ...................... | 476/40 |
| 6,464,616 | B1 | * | 10/2002 | Kamamura et al. | ........... | 476/72 |
| 6,565,478 | B1 | * | 5/2003 | Yamamoto | .................... | 476/40 |
| 6,733,415 | B1 | * | 5/2004 | Yamamoto | .................... | 476/46 |

| 2002/0019288 | A1 | * | 2/2002 | Yamamoto | .................... | 476/40 |

FOREIGN PATENT DOCUMENTS

JP    2000-199552 A    7/2000
JP    2002-54707 A    2/2002

* cited by examiner

*Primary Examiner*—David Fenstermacher
(74) *Attorney, Agent, or Firm*—Foley & Lardner LLP

(57) ABSTRACT

A toroidal type continuously variable transmission comprises input and output discs coaxially and rotatably arranged about a common axis. The input and output discs have respective toroidal concave surfaces which face each other. Power rollers are arranged each having a rounded outer surface and being interposed between the toroidal concave surfaces of the input and output discs. A loading cam is provided that presses the input disc against the power rollers by a force that is proposal to an input torque. Trunnions are provided each supporting the corresponding power roller in such a manner that the power roller is inclinable relative to a center of curvature of the input and output discs. Power roller bearings are arranged to rotatably support the power rollers relative to the respective trunnions. The following inequality is established:

$$Ro/(2 \times R22) \leq 0.63$$

wherein:
- Ro: radius of curvature of the toroidal concave surface of each of the input and output discs, that is defined on a cross section of each of the input and output discs taken along the common axis,
- R22: radius of curvature of the rounded outer surface of each power roller, that is defined on a cross section of the power roller taken along the common axis.

10 Claims, 8 Drawing Sheets

TOROIDAL TYPE CONTINUOUSLY VARIABLE TRANSMISSION

BACKGROUND OF THE INVENTION

1. Field of the Invention

The present invention relates in general to continuously variable transmissions used in wheeled motor vehicles, and more particularly to the continuously variable transmissions of a toroidal type.

2. Description of the Related Art

One of the toroidal type continuously variable transmissions is shown in Japanese Patent First Provisional Publication (tokkai) 2000-199552, which generally comprises an input disc driven by an engine, an output disc connected to driving road wheels and two power rollers each being pivotally interposed between the input and output discs to effect a power transmission from the input disc to the output disc while continuously changing a rotation speed of the output disc with respect to a speed of the input disc.

In the publication, the input and output discs and power rollers are discussed on shape and mutual positioning of them for the purpose of obtaining a sufficient power transmission efficiency and a sufficiently long life of the transmission. That is, for that purpose, radius of curvature of cross section of each disc taken along a common axis of the input and output discs and an angle defined between a normal line at a point where each disc and corresponding power roller contact and an axis of rotation of the power roller are discussed.

SUMMARY OF THE INVENTION

However, the publication fails to show the method of determining the radius of curvature of the power roller with respect to both the power transmission efficiency and life of the transmission. These two things are those greatly influenced by a bearing stress generated at a point where two rotation members (viz., power roller and input or output disc) contact. That is, if the bearing stress is reduced, the life of these rotation members is increased. However, in this case, the power transmission efficiency is reduced due to an inevitable increase in a spin degree. The bearing stress can be calculated by using a so-called "Hertz's Law", that is, by the shape of contacting point of the two rotation members. That is, actually, a radius of curvature and a load at the contact point determine the bearing stress. Accordingly, in order to get an appropriate value in both power transmission efficiency and life of the transmission, more specifically, in order to get an appropriate values for those of the power roller and input and output discs in a well-balanced manner, it is necessary to determine the radius of curvature of the input and output discs, the radius of curvature of the power rollers and the load applied to them to appropriate values.

Accordingly, it is an object of the present invention to provide a toroidal type continuously variable transmission which is constructed to have satisfaction in both the power transmission efficiently and the life by suitably determining the ratio between a radius of curvature possessed by the input and output discs and a radius of curvature possessed by the power rollers.

According to the present invention, there is provided a toroidal type continuously variable transmission which comprises input and output discs coaxially and rotatably arranged about a common axis, the input and output discs having respective toroidal concave surfaces which face each other; power rollers each having a rounded outer surface and being interposed between the toroidal concave surfaces of the input and output discs; a loading cam that presses the input disc against the power rollers by a force that is proposal to an input torque; trunnions each supporting the corresponding power roller in such a manner that the power roller is inclinable relative to a center of curvature of the input and output discs; and power roller bearings rotatably supporting the power rollers relative to the respective trunnions, wherein the following inequality is established for a curvature ratio ($Ro/(2 \times R22)$):

$$Ro/(2 \times R22) \leq 0.63$$

wherein:

Ro: radius of curvature of the toroidal concave surface of each of the input and output discs, that is defined on a cross section of each of the input and output discs taken along the common axis, R22: radius of curvature of the rounded outer surfaces of each power roller, that is defined on a cross section of the power roller taken along the common axis.

DETAILED DESCRIPTION OF THE EMBODIMENTS

In the following, five embodiments 100, 200, 300, 400 and 500 of the present invention will be described in detail with reference to the accompanying drawings.

For ease of understanding, various directional terms, such as, right, left, upper, lower, rightward etc., may be used in the following description. However, such terms are to be understood with respect to a drawing or drawings on which a corresponding part or portion is shown.

First Embodiment 100

Figure 1:
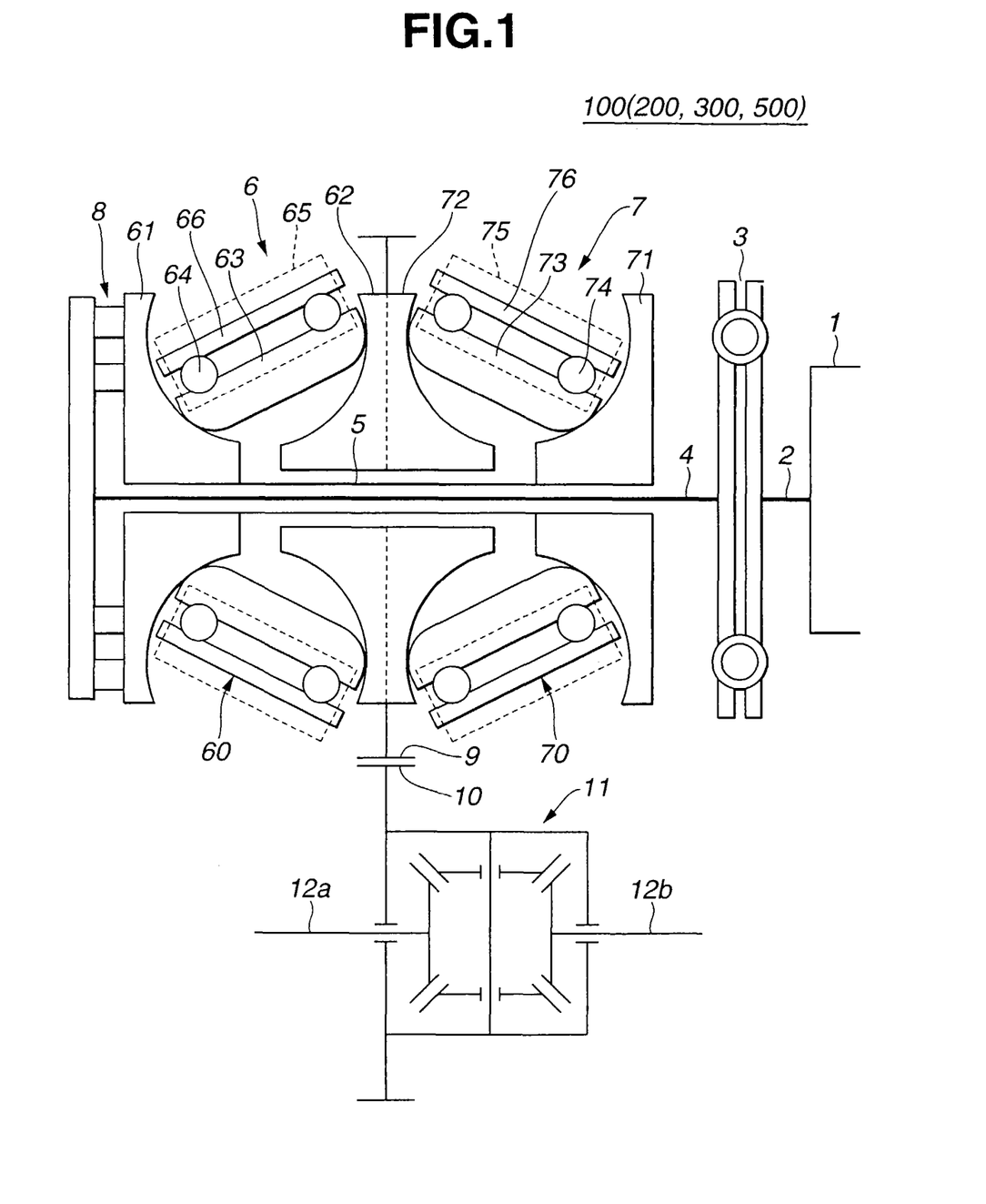
FIG. 1 is a schematic view of a toroidal type continuously variable transmission which is a first embodiment of the present invention.

Referring to FIGS. 1 to 4, particularly FIG. 1, there is schematically shown a toroidal type continuously variable transmission 100 which is a first embodiment of the present invention.

As shown in FIG. 1, the transmission 100 is of a half toroidal type having dual cavities, which comprises an input shaft 4 that is connected through a torsion damper 3 to an output shaft 2 of an engine 1, and a hollow shaft 5 that is rotatably disposed about input shaft 4.

Around a common axis of the two shafts 4 and 5, there are disposed first and second toroidal power transmission units 6 and 7. First power transmission unit 6 is positioned away from torsion damper 3 with respect to second power transmission unit 7. The two units 6 and 7 have respective input discs 61 and 71, and have output discs 62 and 72 which are united. Input disc 61 of first power transmission unit 6 is positioned away from torsion damper 3 with respect to input disc 71 of second power transmission unit 7, as shown. The two input discs 61 and 71 are biased toward each other by a loading cam 8 in such a manner as will be described hereinafter.

First and second power transmission units 6 and 7 are of substantially the same construction. Each unit 6 or 7 comprises input disc 61 or 71 having a toroidal concave surface and output disc 62 or 72 also having a toroidal concave surface. As is described hereinabove, output discs 62 and 72 are united to constitute a single unit.

As shown, in first power transmission unit 6, input and output discs 61 and 62 are arranged with their toroidal concave surfaces facing each other, and in second power transmission unit 7, input and output discs 71 and 72 are arranged with their toroidal concave surfaces facing each other.

Two power rollers 60 are interposed between the toroidal concave surfaces of input and output discs 61 and 62, and other two power rollers 70 are interposed between the toroidal concave surfaces of input and output discs 71 and 72.

As is seen from FIG. 1, input discs 61 and 71 of first and second power transmission units 6 and 7 are disposed on left and right ends of hollow shaft 5 with a spline-connection provided therebetween. That is, input disc 61 or 71 is rotated with hollow shaft 5 about the common axis while being permitted to slide axially relative to hollow shaft 5. The output disc unit (62 and 72) is rotatably disposed on a middle portion of hollow shaft 5.

Each power roller 60 or 70 comprises a power roller inner member 63 or 73 that contacts both input and output discs 61 and 62 (or, 71 and 72), a power roller bearing 64 or 74 that rotatably supports power roller inner member 63 or 73 and a power roller outer member 66 or 76 that is provided on a back side of power roller bearing 63 or 74.

Figure 2:
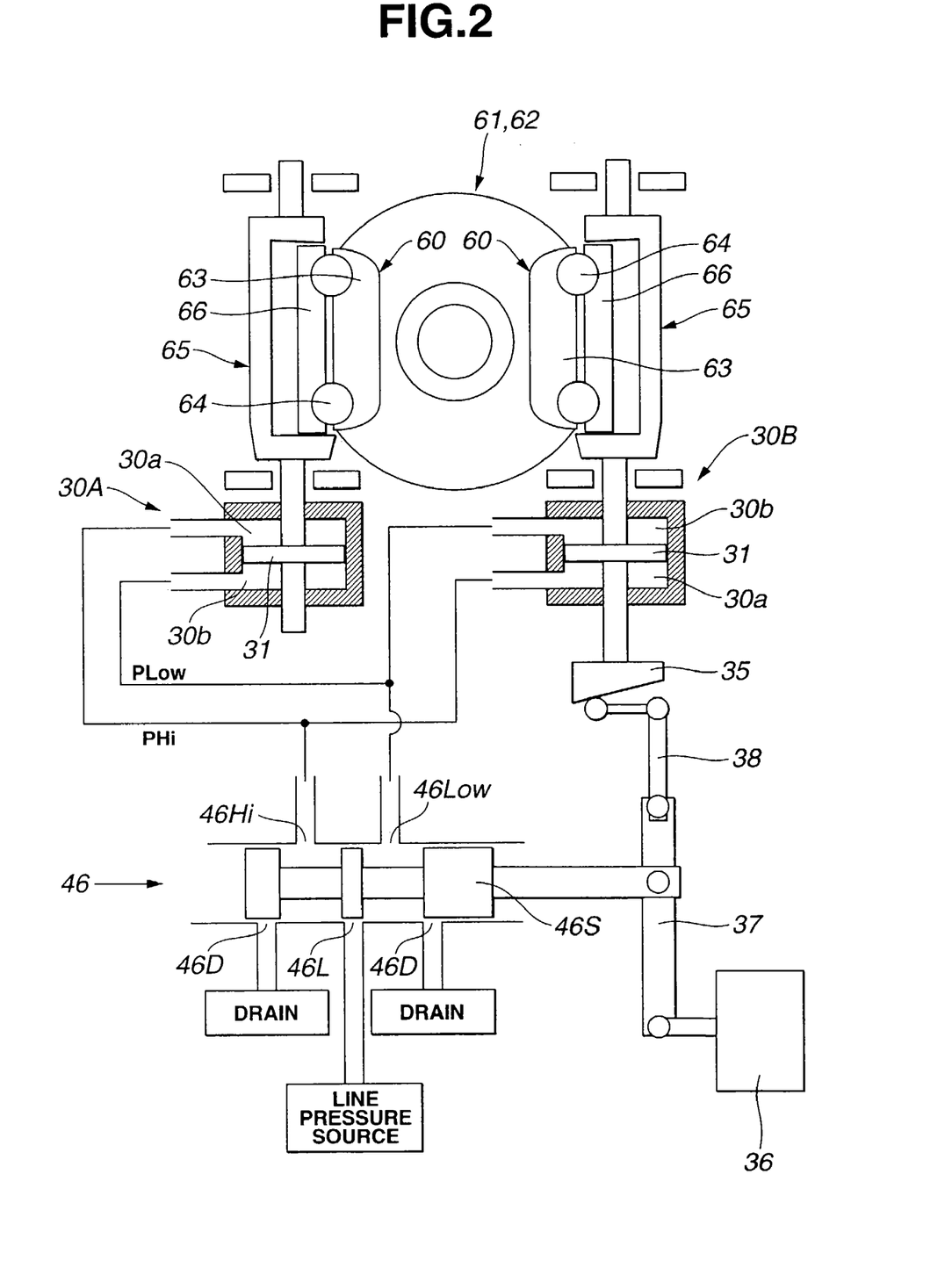
FIG. 2 is a schematic view of a speed change control system that controls of the transmission of the first embodiment.

As is understood from FIGS. 1 and 2, each power roller 60 or 70 is supported by a trunnion 65 or 75 in such a manner as to be inclinable about a center axis of trunnion 65 or 75. The center axis of trunnion 65 or 75 will be referred to as an inclination rotation axis in the following description. Although not shown in the drawings, an eccentric shaft is provided for each trunnion 65 or 75 for permitting a swing movement of each power roller 60 or 70. Furthermore, a needle bearing (not shown) is provided for each trunnion 65 or 75 to permit a parallel movement of each power roller 60 or 70.

As is shown in FIG. 1, the output disc unit (62 and 72) is formed on a cylindrical outer surface thereof with teeth which serve as an output gear 9. Meshed with output gear 9 is a drive gear 10 of a differential device 11. From differential device 11, there extend left and right drive shafts 12a and 12b each having at a leading end a road wheel (not shown). That is, a certain torque of output gear 9 is transmitted to the left and right road wheels through drive gear 10 of differential device 11, mutually meshed gears (no numerals) of differential device 11 and drive shafts 12a and 12b, in a known manner.

Referring to FIG. 2, there is schematically shown a hydraulic control system of the transmission 100.

Explanation will be directed to a speed change system for first toroidal power transmission unit 6. That is, for achieving a speed change in the first power transmission unit 6, each trunnion 65 by which power roller 63 is supported is subjected to an offset displacement between a neutral position where the center of power roller 60 is coincident with respective centers of input and output discs 61 and 62 and an upper or lower position relative to the neutral position. By this offset displacement, there is produced a difference in vector in a rotation direction between power roller 60 and each of input and output discs 61 and 62, which forces power roller 60 to be inclined.

Each trunnion 65 is connected to a servo piston 31 of a hydraulic servo system 30A or 30B which has high and low side chambers 30a and 30b partitioned by servo piston 31. That is, trunnion 65 is subjected to the displacement when servo piston 31 is moved upon production of a pressure difference between high and low side chambers 30a and 30b.

The hydraulic pressure in each of high and low side chambers 30a and 30b is controlled by a shift control valve 46. Shift control valve 46 comprises a spool 46S slidably received in a cylindrical bore (no numeral). High side chamber 30a is connected to the bore through a high side port 46Hi, and low side chamber 30b is connected to the bore through a low side port 46Low. Furthermore, two drain ports 46D are provided to the bore, and a line pressure port 46L is connected to a middle portion of the bore. Line pressure port 46L is connected to a line pressure source. Thus, when spool 46S is moved axially in one direction, the line pressure from the line pressure source is applied to one of high and low side chambers 30a and 30b discharging any pressure in the other of the chambers 30a and 30b through corresponding drain port 46D. With this hydraulic operation, two servo pistons 31 are moved causing the offset displacement of trunnions 65.

As is seen from FIG. 2, one of the trunnions 65, that is, the right trunnion 65 of the hydraulic servo system 30B, is associated with a feedback mechanism. That is, right trunnion 65 is equipped with a precess cam 35. Although not shown in the drawing, precess cam 35 is formed with a curved groove with which one end of an L-shaped pivot link 38 slidably contacts. The other end of L-shaped pivot link 38 is pivotally connected to one end of an I-shaped link 37. Thus, information on both the offset displacement and the incline angle of the right trunnion 45 is fed back to I-shaped link 37 through precess cam 35 and L-shaped link 38. The other end of I-shaped link 37 is connected to an output rod of a step motor 36. The above mentioned spool 46S of shift control valve 46 has a leading end pivotally connected to a middle portion of I-shaped link 37. Accordingly, the position of spool 46S is determined by the action of step motor 36 and the feedback action from the right trunnion 65.

Figure 3:
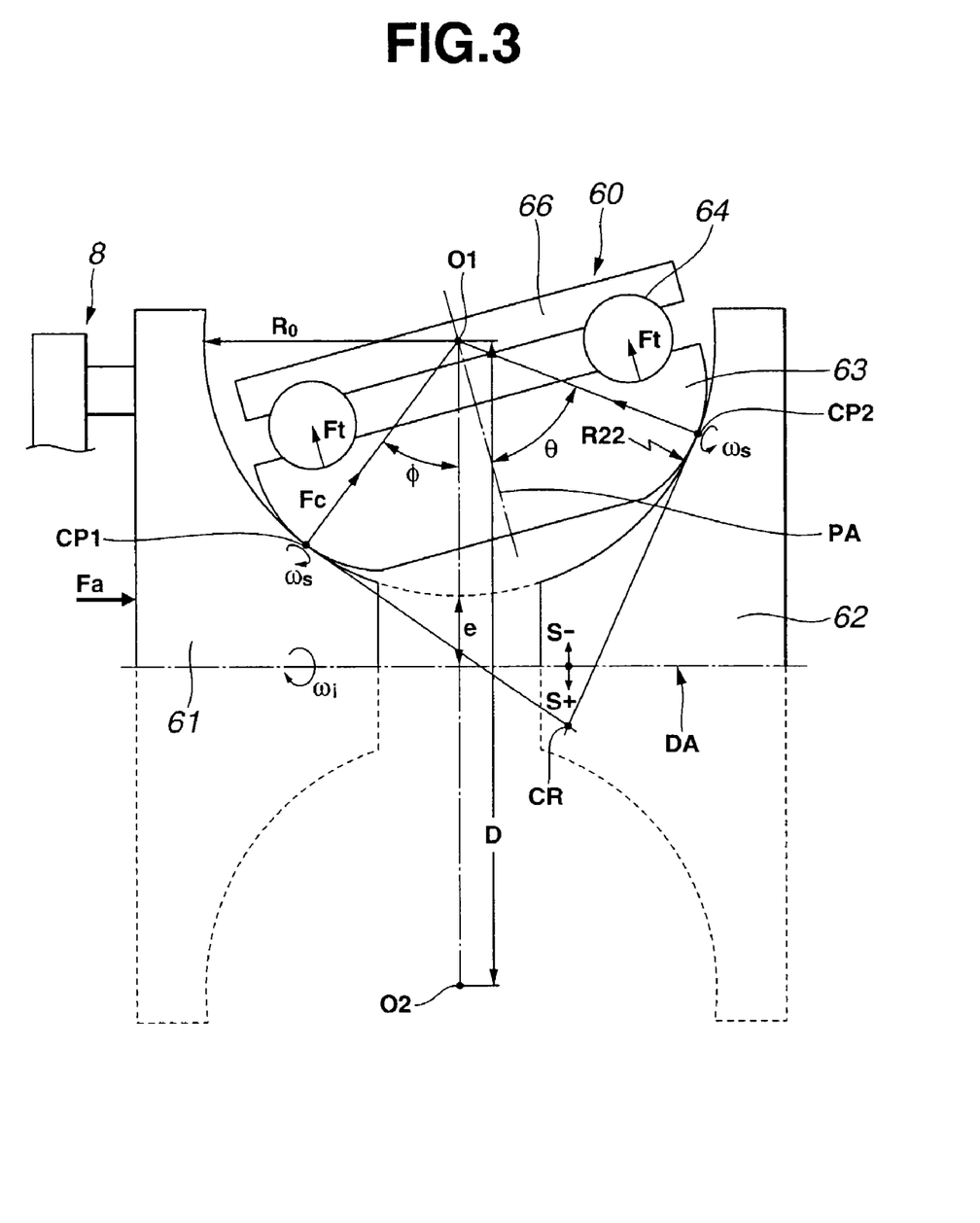
FIG. 3 is a view for explaining dimensional data (or parameters) for parts employed in the transmission of the first embodiment.

Referring to FIG. 3, there is schematically shown an illustration for explaining dimensional data (or parameters) for parts of first power transmission unit 6.

In this drawing, one power roller 60, loading cam 8, input disc 61, output disc 62, power roller inner member 63, power roller bearing 64 and power roller outer member 66 are illustrated in an exaggerated manner.

Denoted by reference CP1 is a contact point between power roller 60 and input disc 61 and denoted by reference CP2 is a contact point between power roller 60 and output disc 62. Denoted by reference "O1" is a center of curvature possessed by the toroidal concave surfaces of input and output discs 61 and 62. Denoted by reference PA is a rotation axis of power roller 60, DA is a common rotation axis of input and output discs 61 and 62, reference CR is an intersection point between a tangential line of contact point CP1 and another tangential line of contact point CP2, reference "S" is a spin degree, reference "$\overline{\omega}s$" is a spin angular speed of power roller 60, reference "$\overline{\omega}i$" is an angular speed of input disc 61, reference "θ" is an open angle defined between a normal line of contact point CP2 and rotation axis PA of power roller 60, reference "ϕ" is an inclination angle of power roller 60, reference "Ro" is a radius of curvature of the toroidal concave surfaces of input and output discs 61 and 62, reference "e" is a distance between common rotation axis DA of input and output discs 61 and 62 and an imaginary circle including the toroidal concave surfaces of input and output discs 61 and 62, that is, a difference between a distance from the center of curvature "O1" to common rotation axis DA and the radius of curvature "Ro" of input and output discs 61 and 62, reference R22 is a radius of curvature of a rounded outer surface of power roller 60 and reference D is a distance between the center of curvature "O1" and another center of curvature "O2". It is to be noted that another center of curvature "O2" is possessed by the other power roller (60) that is arranged at a diametrically opposite position of power roller 60 as is seen from FIG. 1.

Denoted by reference Fa is a biasing force produced by loading cam 8 for pressing input disc 61 against power roller 60, reference Fc is a load exerted at contact points CP1 and CP2, and reference Ft is a thrust load exerted on power roller bearing 64.

Although not shown in the drawings, second toroidal power transmission unit 7 has substantially the same dimensional data (parameters) as those mentioned above.

In toroidal type continuously variable transmission 100 of the first embodiment of the invention, the following inequality is established for a curvature ratio (viz., Ro/(2×R22)):

$$Ro/(2 \times R22) \leq 0.63 \tag{1}$$

In the following, operation of the transmission 100 will be described with reference to the drawings, especially FIGS. 1 to 3.

For simplification, the description will be directed to the operation of only first toroidal power transmission unit 6.

[Speed Change Operation]

First, explanation on a speed change operation will be made.

As is seen from FIG. 2, for varying a speed change ratio of the transmission 100, two power rollers 60 are inclined by displacing trunnions 65 and 65 toward the respective inclination rotation axes (viz., center axes of trunnions 65 and 65).

That is, upon receiving an instruction signal from a transmission control unit (not shown) for inducing a desired speed change of the transmission 100, step motor 36 is energized to move spool 46S of shift control valve 46 by a certain distance in a desired direction. With this, the line pressure from the line pressure source is applied to one of high and low side chambers 30a and 30b of each hydraulic servo system 30A or 30B discharging any pressure in the other of the chambers 30a and 30b, and thus each trunnion 65 is displaced toward the inclination rotation axis.

Thus, the rotation axis PA of each power roller 60 is forced to make an offset movement relative to a disc rotation center position (or common rotation axis DA of input and output discs 61 and 62). Because of the offset movement of the rotation axis PA, contact points CP1 and CP2 at which input and output discs 61 and 62 contact each power roller 60 produces a side slip force inducing the inclination of each power roller 60.

As is seen from FIG. 2, the inclination movement of power roller 60 and the offset movement of the rotation axis PA are transmitted to spool 46S of shift control valve 46 through precess cam 35 and L-shaped pivot link 38. Actually, spool 46S is stopped at a position where an actuating force from step motor 36 and an actuating force from L-shaped pivot link 38 are balanced. When the inclination angle "ϕ" of power roller 60 comes to show a desired value for the desired speed change ratio, the offset displacement given to trunnions 65 becomes cancelled returning the rotation axis PA of each power roller 60 back to the original disc rotation center position. Upon this, the inclination movement of power roller 60 is stopped and thus the desired speed change ratio is set in the transmission 100 keeping the inclination angle "ϕ" of power roller 60 at the desired value.

It is to be noted that similar operation takes place in second toroidal power transmission unit 7 with power rollers 70.

[Power Transmission Efficiency & Life]

As is described hereinabove, in the first embodiment 100, the curvature ratio (viz., Ro/(2×R22)) is determined not larger than 0.63 (or 63%).

Figure 4:
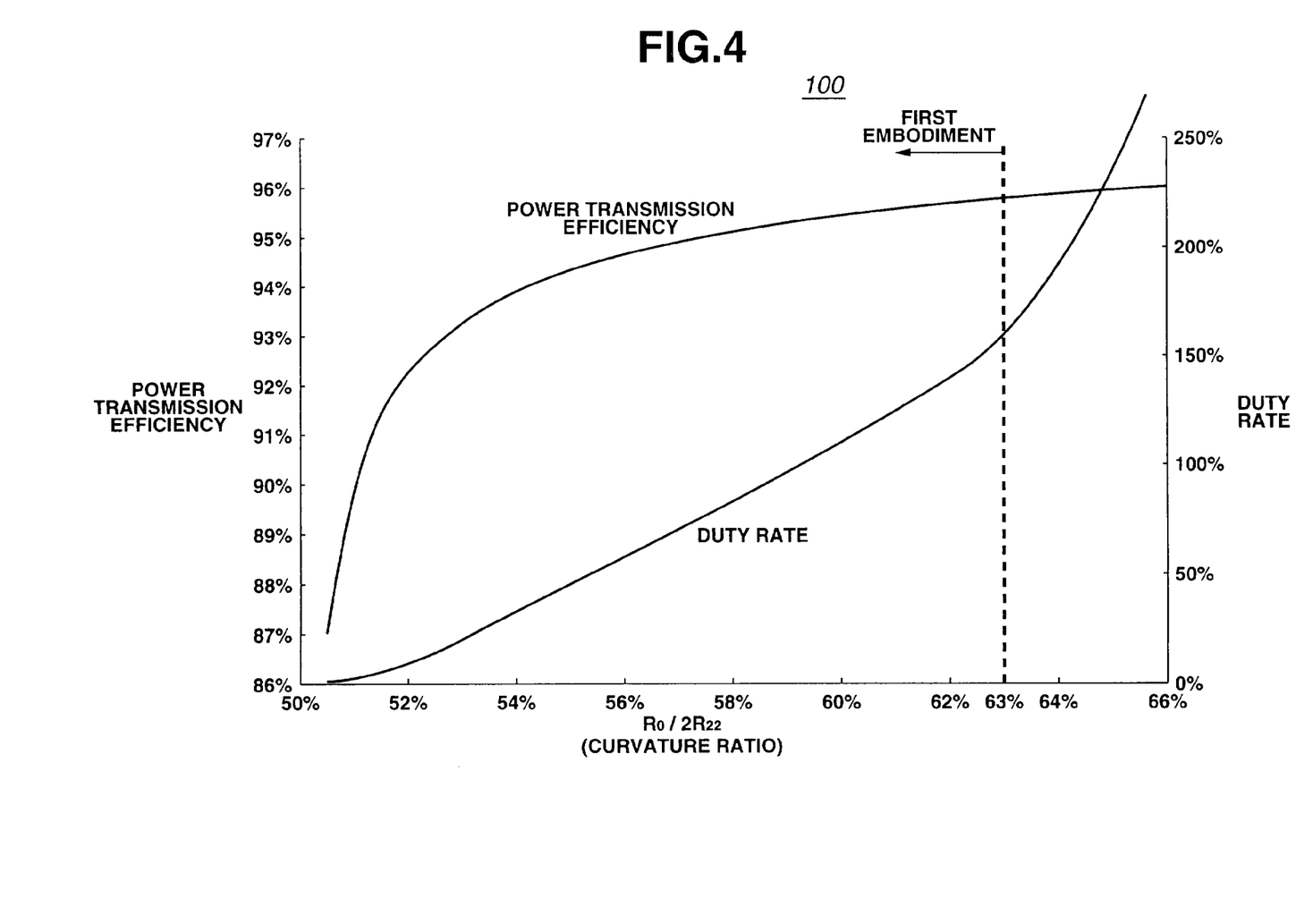
FIG. 4 is a graph showing a duty rate and a power transmission efficiency with respect to a curvature ratio between a radius of curvature of input and output discs and that of each power roller, which are practically employed in the transmission of the first embodiment.

FIG. 4 is a graph showing a duty rate and a power transmission efficiency of the first power transmission unit 6 employed in the first embodiment 100 with respect to the curvature ratio.

It is to be noted that the duty rate is represented by the following equation, which can estimate a shorten life when increased:

$$\text{Duty Rate} = (LUT/RL)^{1/3} \tag{2}$$

wherein:
 LUT: Load applied to contact point upon receiving input torque,
 RL: Rated Load, viz., a load that assures a certain life under the same operation condition.

As is known, the rated load is used for estimating the life of a ball bearing.

As the curvature ratio (viz., Ro/(2×R22)) increases, the contact surface between power roller 60 and each of input and output discs 61 and 62 is reduced, and thus the power transmission efficiency is increased. However, with reduction of the contact surface between power roller 60 and each of input and output discs 61 and 62, a bearing stress at the contact point (or surface) is increased and thus the duty rate is increased, which induces a shorten life of the unit 6.

That is, the life of the toroidal power transmission unit 6 can be estimated by the duty rate. This will be much easily understood from the following explanation.

As is understood from the graph of FIG. 4, when the curvature ratio (viz., Ro/(2×R22)) exceeds 0.63 (viz., 63%), an increasing rate of the duty rate relative to the curvature ratio greatly increases. That is, if the curvature ratio (viz., Ro/(2×R22)) is set higher than 0.63 (viz., 63%), power roller 60 and input and output discs 61 and 62 have to bear against quite high load. In this case, such power rollers 60 and discs 61 and 62 have to be constructed of a specialized and thus expensive material.

While, in the first embodiment 100, the curvature ratio (viz., Ro/(2×R22)) is determined not higher than 0.63 (63%), relatively small duty rate is obtained. Thus, power rollers 60 and discs 61 and 62 can be constructed of a normal material which is not expensive. In other words, in the first embodiment 100, longer life of the unit 6 or 7 is assured.

Second Embodiment 200

A toroidal type continuously variable transmission 200 of a second embodiment of the present invention is substantially the same as that of the above-mentioned first embodiment 100 except the range the curvature ratio (viz., Ro/(2×R22)).

That is, in the second embodiment 200, the following inequality is established:

$$0.53 \leq Ro/(2 \times R22) \leq 0.63 \qquad (3)$$

That is, in the second embodiment 200, the curvature ratio is not smaller than 0.53 (or 53%) and not larger than 0.63 (or 63%).

Figure 5:
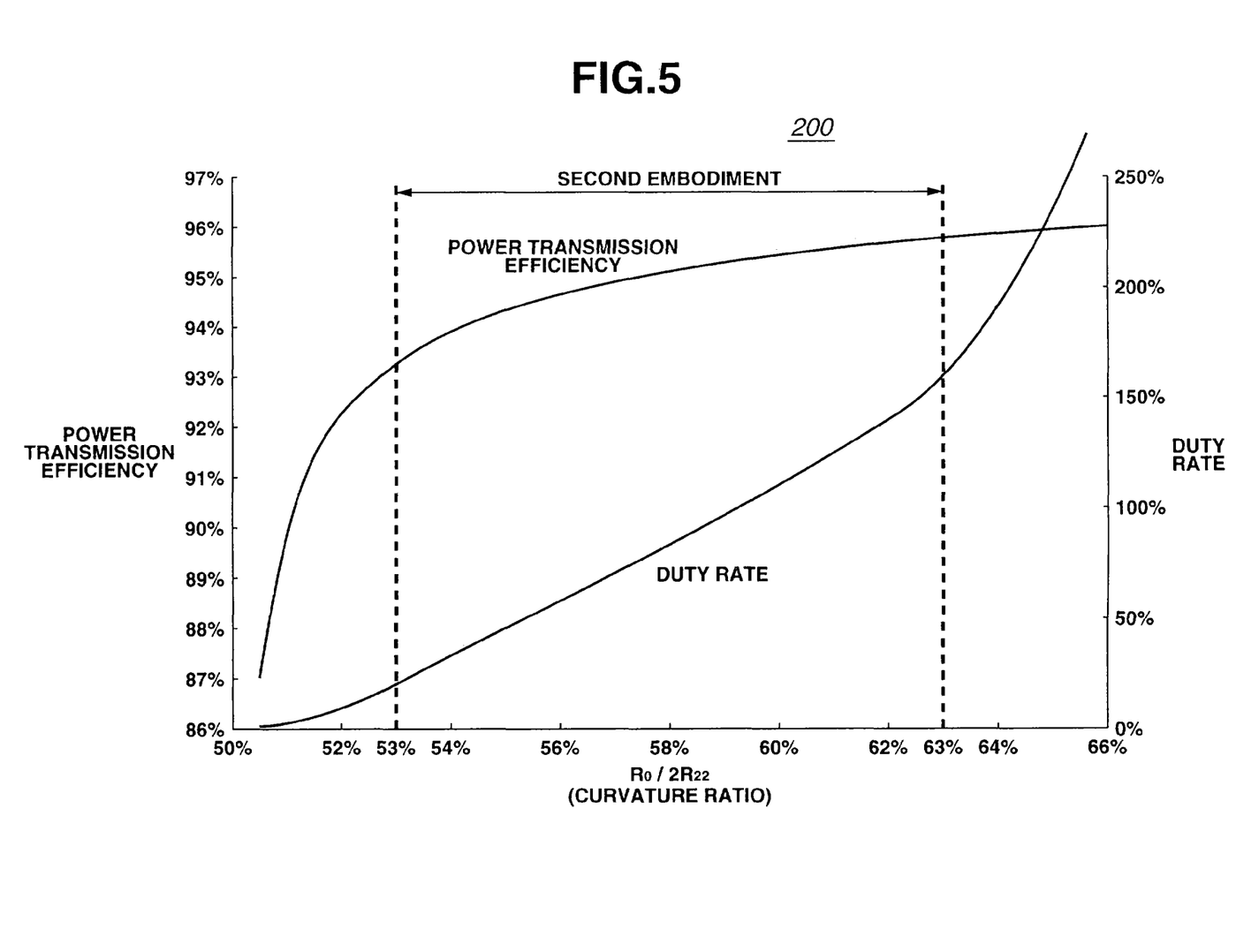
FIG. 5 is a graph similar to FIG. 4, but showing a duty rate and a power transmission efficiency which are practically employed in a transmission of a second embodiment of the present invention.

As is seen from the graph of FIG. 5, the power transmission efficiency increases with increase of the curvature ratio (Ro/(2×R22)). This is because the contact surface between power roller 60 and each of input and output discs 61 and 62 is reduced with increase of the curvature ratio (Ro/(2×R22)). However, as is seen from the graph, when the curvature ratio (Ro/(2×R22)) becomes smaller than 0.53 (viz., 53%), the power transmission efficiency suddenly lowers.

Thus, in the second embodiment 200, the curvature ratio is determined not smaller than 0.53 (or 53%) and not larger than 0.63 (or 63%). With this, higher power transmission efficiency and sufficient life of the unit 6, that is, the life of the transmission 200 are both obtained.

Figure 6:
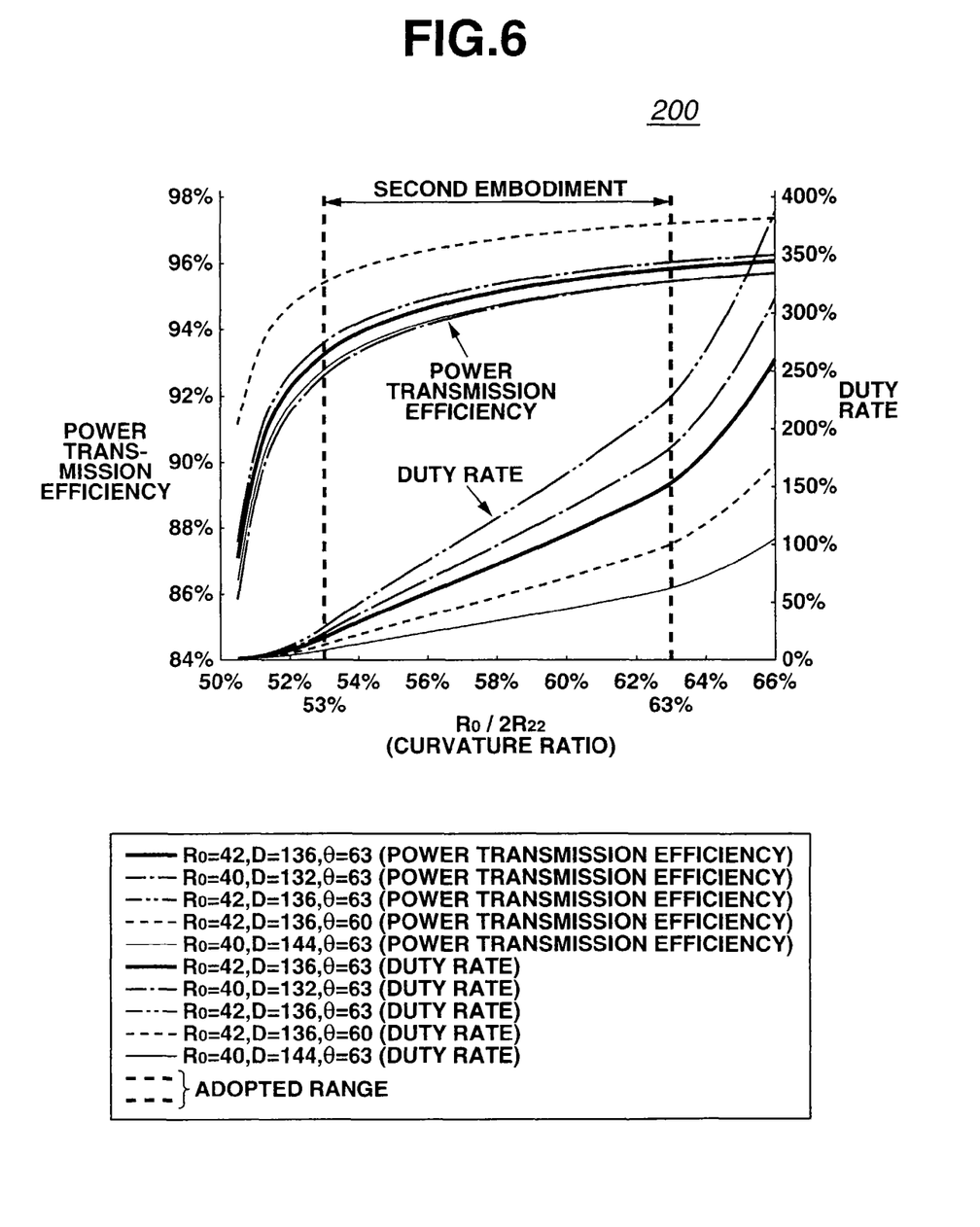
FIG. 6 is a graph similar to FIG. 5, but showing duty rates and power transmission efficiencies in case of the second embodiment with dimensional data (or parameters) for parts being varied.

Referring to FIG. 6, there is shown a graph which is similar to FIG. 5, but shows duty rates and power transmission efficiencies in case of the second embodiment 200 with the dimensional data (parameters) "Ro", "D" and "θ" of the parts being varied. As is mentioned hereinabove, "Ro" is a radius of curvature of the toroidal concave surfaces of input and output discs 61 and 62, "D" is a distance between the center of curvature "O1" and another center of curvature "O2" and "θ" is an open angle defined between a normal line of contact point CP2 and rotation axis PA of power roller 60.

As is understood from this graph, even when the dimensional data "Ro", "D" and "θ" of the parts change, the relation of the power transmission efficiency and the duty rate relative to the curvature ratio (Ro/(2×R22)) is the same as that in case of the graph of FIG. 5. That is, in all cases, once the curvature ratio becomes lower than 0.53 (or 53%), the power transmission efficiency sharply lowers, and once the curvature ratio exceeds 0.63 (or 63%), the duty rate sharply increases.

As is mentioned hereinabove, in the second embodiment 200, the curvature ratio is set not higher than 0.63 (63%) and not lower than 0.53 (or 53%). Thus, in the second embodiment 200, a higher power transmission efficiency and a satisfied life of the unit 6 or 7, that is, of the transmission 200, are both obtained irrespective of variation of other parameters "Ro", "D" and "θ" of the parts.

Third Embodiment 300

In this third embodiment 300, in addition to establishment of one of the above-mentioned inequalities (1) and (3), the following inequality is established for a bearing stress "BS":

$$BS \leq 4.2 \text{ Gpa} \qquad (4)$$

As is mentioned hereinabove, the bearing stress "BS" is a stress applied to the contact surface between power roller 60 and each of input and output discs 61 and 62.

As is known in the field of roller bearings, a plastic deformation tends to occur in the contact surface when the bearing stress exceeds 4.2 Gpa, which may cause a vibration and noise of the roller bearing. Accordingly, in the field of roller bearings, it is recommended to use the roller bearing by keeping the bearing stress at a value lower than 4.2 Gpa. In view of this fact, the parameter of the bearing stress is employed in the third embodiment 300. Strictly speaking, the value of the bearing stress should be considered with respect to a material of power roller 60 and input and output discs 61 and 62.

In order to keep the bearing stress "BS" at the value lower than 4.2 Gpa under operation of the power transmission unit 6 or 7, the following measures may be employed.

First, a biasing force "Fa" produced by loading cam 8 is calculated from the following equation:

$$Fa = 2\pi T/L \qquad (5)$$

wherein:
T: Engine torque,
L: Cam load per each turn.

Then, a load "Fc" generated between power roller 60 and each of input and output discs 61 and 62 is calculated from the following equation:

$$Fc = Fa/n/\sin\phi \qquad (6)$$

wherein:
n: number of power roller,
φ: inclination angle of power roller.

Then, by using the result of calculation of the equation (6), the curvature ratio (Ro/(2×R22)) is determined in such a way that even when, with the biasing force "Fa" of loading cam 8 exhibiting the maximum value "Famax", the inclination angle "φ" of power roller 60 is changed between its minimum and maximum values, the bearing stress "BS" calculated by the "Hertz's Law" does not exceed 4.2 GPa.

That is, in the third embodiment 300, the bearing stress "BS" is set not higher than 4.2 GPa in addition to establishment of one of the above-mentioned inequalities (1) and (3). Thus, in this embodiment 300, in addition to the effective power transmission and longer life of the unit 6 or 7, a smoothed power transmission is achieved without inducing the possibility of forming scratches at the points (or surfaces) where power roller 60 contacts input and output discs 61 and 62, which would cause noise and/or vibration of the unit 6 or 7.

Fourth Embodiment 400

Figure 7:
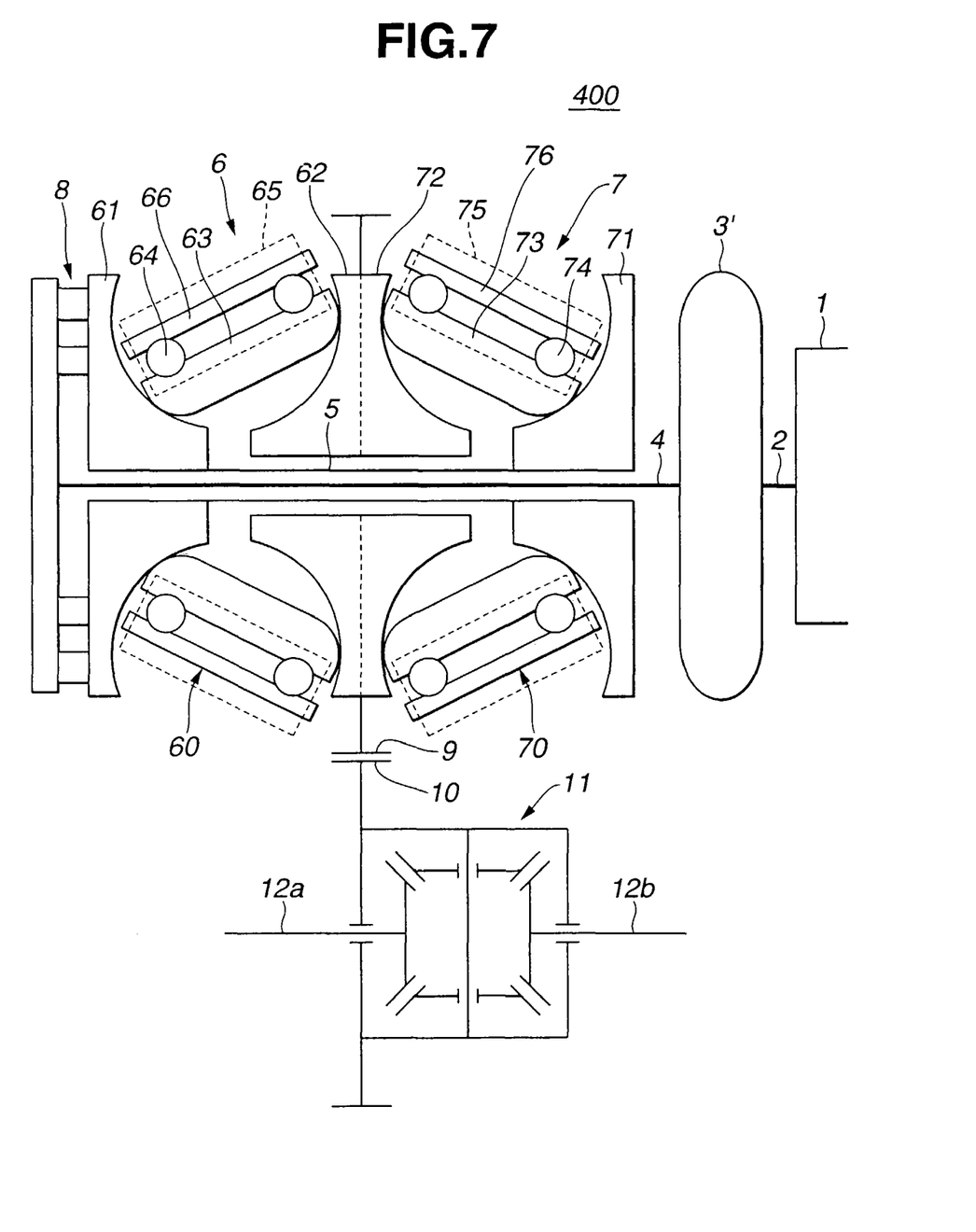
FIG. 7 is a view similar to FIG. 1, but showing a toroidal type continuously variable transmission which is a fourth embodiment of the present invention.

Referring to FIG. 7, there is schematically shown a toroidal type continuously variable transmission 400 which is a fourth embodiment of the present invention.

As is seen from this drawing, in this embodiment 400, a torque converter 3' is used in place of the torsion damper 3 employed in the above-mentioned first, second and third embodiments 100, 200 and 300. That is, torque converter 3' is interposed between input shaft 4 of the transmission 400 and output shaft 2 of engine 1.

In this embodiment 400, the following two requirements are established.

$$Ro/(2\times R22) \leq 0.63 \text{ or } 0.53 \leq Ro/(2\times R22) \leq 0.63$$

and, $$BSt \leq 4.2 Gpa$$

Because of the torque amplifying function of torque converter 3', the torque actually applied to input discs 61 and 71 becomes larger than an engine torque especially at the time when the associated vehicle starts to run. Thus, if the curvature ratio ($Ro/(2\times R22)$) is so set that the bearing stress "BSt" does not exceed 4.2 GPa, it may occur that the curvature ratio becomes smaller than 0.53 (viz., 53%). However, at the time of vehicle starting, rotation speed of input shaft 4 is relatively low and the time for which such load is kept applied to the contact point between power roller 60 and each of input and output discs 61 and 62 is relatively short, and thus, having the curvature ratio exceeding 0.53 (viz., 53%) has substantially no influence on the excellency of the life and the power transmission efficiency of the unit 6 or 7.

Fifth Embodiment 500

In this fifth embodiment 500, in addition to establishment of one of the above-mentioned inequalities (1) and (3), the following inequality is established for the spin degree "S":

$$S \geq 0 \tag{7}$$

It is to be noted that the spin degree "S" denotes the spin degree at the contact point CP1 or CP2 between power roller 60 and input or output disc 61 or 62 (see FIG. 3).

The spin degree "S" is calculated from the following equation as is described in Japanese Patent First Provisional Publication (tokkai) 2002-054707:

$$S = \varpi s / \varpi i \tag{8}$$

$$= \{\sin\theta \times \sin\phi - (1 + k - \cos\phi) \times \cos\theta\}/\sin\theta \tag{9}$$

That is, in this fifth embodiment 500, in order to keep the spin degree "S" equal to or greater than 0 (zero) throughout a range of speed change ratio from 2.0 (viz., low speed side) to 0.5 (viz., high speed side), the open angle "θ" (see FIG. 3), the inclination angle "φ" and a cavity aspect ratio "k" (viz., e/Ro) are suitably set.

It is to be noted that as is seen from FIG. 3, when the spin degree "S" assumes a positive value "S+" greater than 0 (zero), the intersection point "CR" is positioned beyond the common rotation axis "DA" of input and output discs 61 and 62 with respect to the center of curvature "O1". If the spin degree "S" assumes 0 (zero), the intersection point "CR" is placed on the rotation axis "DA", and if the spin degree "S" assumes a negative value "S−" smaller than 0 (zero), the intersection point "CR" is positioned near the center of curvature "O1" with respect to the rotation axis "DA".

In this fifth embodiment 500, the spin degree "S" is determined to assume a positive value "S+" throughout the range from the low speed side to the high speed side, and thus the spin degree "S" constantly assumes |S|. Accordingly, as is seen from the graph of FIG. 8, when the speed change ratio "i" changes from 1 (one) in either of higher and lower speed sides, the absolute value |S| of the spin degree "S" simply reduces.

This means that the absolute value |S| of the spin degree "S" and the load "Fc" exerted at the contact point CP1 or CP2 generally cancel each other. Thus, when considering a power loss characteristic at the contact point CP1 or CP2 that is proportional to a product of the absolute value |S| and the load "Fc", it is revealed that the power loss "u1" at the power point shows no increase in both lower and higher speed change sides. Accordingly, as is seen from the graph of FIG. 8, a total power loss "U" of the fifth embodiment 500 in the lower and higher speed change sides can be reduced as compared with a total power loss "U" of the related art.

Since the spin degree "S" is set to assume a positive value "S+" throughout the entire range of speed change ratio, in the fifth embodiment 500, the absolute value |S| of the spin degree "S" at and around the speed change ratio of 1 (one) is larger than the absolute value |S| of the spin degree "S" of the related art. Thus, the power loss "u1" at the contact point CP1 or CP2 that is proportional to the product of the value |S| and "Fc" is somewhat increased, as is seen from the graph of FIG. 8.

When considering a bearing power loss "u2", the following equation is established for a thrust load "Ft" exerted on power roller bearing 64 or 74 (see FIG. 7):

$$Ft = 2Fc \times \cos\theta \tag{10}$$

As is seen from this equation (10), the thrust load "Ft" can be reduced by increasing the open angle "θ" as compared with that of the related art. Furthermore, since the bearing power loss "u2" is generally proportional to the thrust load "Ft", the bearing power loss "u2" of the fifth embodiment 500 is lower than that of the related art.

Figure 9:
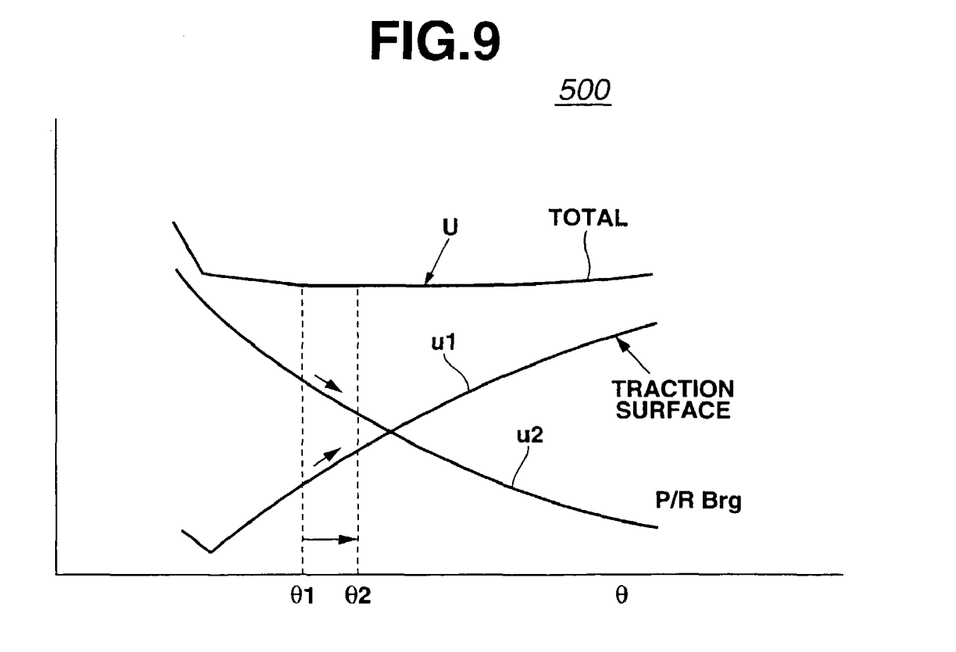
FIG. 9 is a graph showing a power loss at contact point, a bearing power loss and a total power loss in case of the fifth embodiment with an open angle varied.

It is to be noted that the graph of FIG. 9 indicates the power loss "u1" at the contact point CP1 or CP2, the bearing power loss "u2" and the total power loss "U" in the fifth embodiment 500 in case when the open angle "θ" is varied. As is seen from this graph, when the open angle "θ" increases from "θ1" to "θ2", the power loss "u1" at the contact point increases, while, the bearing power loss "u2" reduces. Due to this mutual cancellation, the total power loss "U" at the open angle "θ1" is substantially equal to that at the open angle "θ2".

Figure 8:
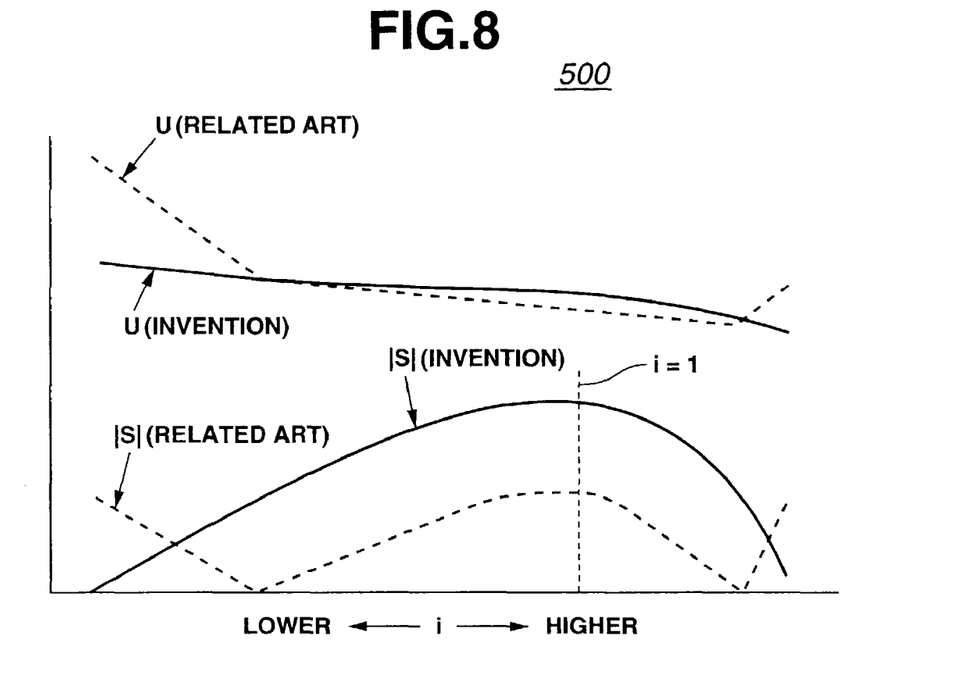
FIG. 8 is a graph showing both a spin absolute characteristic and a total power loss in case of a fifth embodiment of the present invention and those of a related art.

Accordingly, as is seen from the graph of FIG. 8, the total power loss "U" that is the sum of the power loss "u1" at the contact point and the bearing power loss "u2" shows a substantially same value as that of the related art.

As is understood from the above-carried equation (9), the spin degree "S" depends on the open angle "θ", the inclination angle "φ" and the cavity aspect ratio "k" (viz., e/Ro). By making a slight change to the inclination angle "φ", a range of speed change ratio from 2.0 to 0.5 is obtainable, which is substantially equal to that of the related art. Furthermore, if there is no change in the cavity aspect ratio "k" with respect to the related art, the size of the transmission can be the same as that of the related art.

That is, in this fifth embodiment 500, only by changing the open angle "θ" relative to the related art, the total power loss "U" at the lower and higher speed change sides can be reduced even though the maximum value of the spin degree "S" is increased. In this case, the total power loss "U" at and around the speed change ratio of 1 (one) is substantially the same as that of the related art.

Furthermore, in the fifth embodiment 500, only by making a slight change to the inclination angle "φ" of power roller 60, the range of speed change ratio can be made from 2.0 to 0.5 which is substantially equal to that of the relative art. Furthermore, there is no need of changing the cavity aspect ratio "k", change in size of the transmission can be avoided.

Accordingly, in the fifth embodiment 500 of the invention, due to reduction in the total power loss "U" at the lower and higher speed change sides, a higher power transmission efficiency is obtained. Furthermore, since the curvature ratio (viz., Ro/(2×R22)) is determined not smaller than 0.53 (or 53%), the higher power transmission efficiency is much assured.

The entire contents of Japanese Patent Application 2002-246131 (filed Aug. 27, 2002) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A toroidal type continuously variable transmission comprising:
   input and output discs coaxially and rotatably arranged about a common axis, the input and output discs having respective toroidal concave surfaces which face each other;
   power rollers each having a rounded outer surface and being interposed between the toroidal concave surfaces of the input and output discs;
   a loading cam that presses the input disc against the power rollers by a force that is proposal to an input torque;
   trunnions each supporting the corresponding power roller in such a manner that the power roller is inclinable relative to a center of curvature of the input and output discs; and
   power roller bearings rotatably supporting the power rollers relative to the respective trunnions,
   wherein the following inequality is established for a curvature ratio (Ro/(2×R22)):

$Ro/(2 \times R22) \leq 0.63$ wherein:
   Ro: radius of curvature of the toroidal concave surface of each of the input and output discs, that is defined on a cross section of each of the input and output discs taken along the common axis,
   R22: radius of curvature of the rounded outer surface of each power roller, that is defined on a cross section of the power roller taken along the common axis.

2. A toroidal type continuously variable transmission as claimed in claim 1, in which the following inequality is further established:

$Ro/(2 \times R22) \geq 0.53$.

3. A toroidal type continuously variable transmission as claimed in claim 1, in which the following inequality for a bearing stress "BS" is further established:

$BS \leq 4.2 Gpa$ wherein:
   BS: stress applied to a contact surface between the power roller and each of the input and output discs during operation of the transmission.

4. A toroidal type continuously variable transmission as claimed in claim 1, in which the following inequality for a bearing stress "BSt" is established:

$BSt \leq 4.2 Gpa$ wherein:
   BSt: stress applied to a contact surface between the power roller and each of the input and output discs when a maximum engine torque is applied to the transmission.

5. A toroidal type continuously variable transmission as claimed in claim 1, in which the following inequality is further established:

$S \geq 0$ wherein:
   S: spin degree at a contact point between the power roller and each of the input and output discs.

6. A toroidal type continuously variable transmission as claimed in claim 5, in which the spin degree "S" is calculated from the following equation:

$S = \overline{\omega}s/\overline{\omega}i$ wherein:
   $\overline{\omega}s$: spin angular speed of the power roller,
   $\overline{\omega}i$: angular speed of the input disc.

7. A toroidal type continuously variable transmission as claimed in claim 6, in which the spin degree "S" is calculated form the following equation.

$S = \{\sin\theta \times \sin\phi - (1+k-\cos\phi) \times \cos\theta\}/\sin\theta$ wherein:
   θ: open angle defined between a normal line of a contact point between the power roller and the output disc and a rotation axis of the power roller,
   φ: inclination angle of the power roller, and
   k: cavity aspect ratio, that is, ratio of a difference (e) between a distance from the center (O1) of curvature of the input disc to the common axis (DA) of the input and output discs and the radius of curvature (Ro) relative to the radius of curvature (Ro).

8. A toroidal type continuously variable transmission as claimed in claim 5, in which the inequality "S≥0" is kept established throughout a range from a lower speed side to a higher speed side.

9. A toroidal type continuously variable transmission as claimed in claim 1, in which an input member of the loading cam is connected to an engine through a torsion damper.

10. A toroidal type continuously variable transmission as claimed in claim 1, in which an input member of the loading cam is connected to an engine through a torque converter.

* * * * *